US009690785B1

(12) United States Patent
Vagell

(10) Patent No.: US 9,690,785 B1
(45) Date of Patent: Jun. 27, 2017

(54) CHANGE NOTIFICATION ROUTING BASED ON ORIGINAL AUTHORSHIP OF MODIFIED REGION

(71) Applicant: Google Inc., Mountain View, CA (US)

(72) Inventor: Vance Julius Vagell, Kew Gardens, NY (US)

(73) Assignee: GOOGLE INC., Mountain View, CA (US)

( * ) Notice: Subject to any disclaimer, the term of this patent is extended or adjusted under 35 U.S.C. 154(b) by 337 days.

(21) Appl. No.: 14/168,882

(22) Filed: Jan. 30, 2014

(51) Int. Cl.
*G06F 17/00* (2006.01)
*G06F 17/30* (2006.01)

(52) U.S. Cl.
CPC .............. *G06F 17/30011* (2013.01)

(58) Field of Classification Search
CPC ................................ G06F 17/30011
USPC ................................ 707/768, 608
See application file for complete search history.

(56) References Cited

U.S. PATENT DOCUMENTS

| 5,315,703 | A * | 5/1994 | Matheny | G06F 9/542 715/700 |
| 6,678,698 | B2 * | 1/2004 | Fredell | G06Q 10/06 707/608 |
| 7,937,663 | B2 * | 5/2011 | Parker | G06F 3/0483 715/751 |
| 9,256,341 | B2 * | 2/2016 | Megiddo | G06F 3/048 |
| 2004/0003352 | A1 | 1/2004 | Bargeron et al. | |
| 2007/0271502 | A1 * | 11/2007 | Bedi | G06F 17/248 715/230 |
| 2008/0059539 | A1 * | 3/2008 | Chin | G06Q 10/10 |
| 2009/0235181 | A1 * | 9/2009 | Saliba | G06Q 10/10 715/753 |
| 2011/0161425 | A1 * | 6/2011 | Xiao | G06F 17/30368 709/206 |
| 2011/0276396 | A1 * | 11/2011 | Rathod | G06F 17/30867 705/14.49 |
| 2012/0089659 | A1 * | 4/2012 | Halevi | G06F 17/243 709/201 |
| 2012/0192086 | A1 * | 7/2012 | Ghods | G06Q 10/10 715/753 |
| 2012/0278401 | A1 | 11/2012 | Meisels et al. | |
| 2013/0124458 | A1 * | 5/2013 | Barreto | G06F 15/16 707/608 |

(Continued)

FOREIGN PATENT DOCUMENTS

| EP | 2698016 A1 | 2/2014 |
| WO | WO-2015006718 A1 | 1/2015 |

OTHER PUBLICATIONS

Shen, Haifeng, et al., "Flexible Notification for Collaborative Systems", CSWC '20, New Orleans, LA, Nov. 16-20, 2002, pp. 77-86.*

(Continued)

*Primary Examiner* — Robert Stevens
(74) *Attorney, Agent, or Firm* — Ropes & Gray LLP

(57) ABSTRACT

A collaborative document editing system receives an input to a document from a first user. The collaborative document editing system identifies a portion of the document associated with the input and a set of users associated with the identified portion of the document. The collaborative document editing system applies the input to the document and transmits a notification regarding the input to members of the identified set of users other than the first user.

32 Claims, 6 Drawing Sheets

(56) References Cited

U.S. PATENT DOCUMENTS

| | | | |
|---|---|---|---|
| 2013/0185252 A1* | 7/2013 | Palmucci | G06F 17/30011 707/608 |
| 2013/0246901 A1* | 9/2013 | Massand | G06F 17/24 715/229 |
| 2014/0059217 A1 | 2/2014 | Pizurica | |
| 2014/0281870 A1* | 9/2014 | Vogel | G06F 17/246 715/220 |
| 2014/0325629 A1 | 10/2014 | Wertz | |
| 2014/0359069 A1 | 12/2014 | Matute | |

OTHER PUBLICATIONS

Brush, A. J. Bernheim, et al., "Notification for Shared Annotation of Digital Documents", CHI 2002, Minneapolis, MN, Apr. 20-25, 2002, pp. 89-96.*

Morán, Alberto L., et al., "Document Presence Notification Services for Collaborative Writing", CRIWG 2001, Darmstadt, Germany, Sep. 6-8, 2001, pp. 125-133.*

Fuchs, Ludwin, "AREA: A Cross-Application Notification Service for Groupware", Proc. of the 6th European Conf. on Computer-Supported Cooperative Work, Copenhagen, Denmark, Sep. 12-16, 1999, pp. 61-80.*

Carroll, John M., et al., "Notification and awareness: synchronizing task-oriented collaborative activity", Int. J. Human-Computer Studies, vol. 58, © 2003 Elsevier Science Ltd., pp. 605-632.*

Iqbal, Shamsi T., et al., "Oasis: A Framework for Linking Notification Delivery to the Perceptual Structure of Goal-Directed Tasks", ACM Transactions on Computer-Human Interaction, vol. 17, No. 4, Article 15, 28 pages.*

Day, Mark, et al., "The Notification Service Transfer Protocol (NSTP): infrastructure for synchronous groupware", Computer Networks and ISDN Systems, vol. 29, Issues 8-13, Sep. 1997, pp. 905-915.*

Cadiz, JJ, et al., "Using Web Annotations for Asynchronous Collaboration Around Documents", CSCW '00, Philadelphia, PA, Dec. 2-6, 2000, pp. 309-318.*

Anthony, James "blogs.dropbox.com/dropbox/2014/09/do-more-on-the-go-with-a-new-dropbox-for-ios-8/" (Published Sep. 23, 2014), 4 pages.

International Search Report and Written Opinion for PCT/US2016/027926 mailing date Jul. 20, 2016, 11 pages.

Lovejoy, Ben, www.macrurnors.com/2013/02/15/dropbox-for-ios-app-gains-push-riotifications-for-shared-folders-new-pdf-viewer/ (Published Feb. 15, 2013), 6 pages.

Sunil, "blog.gsmarena.com/dropbox-for-android-updated-with-new-notification-feed-and-payment-options-for-pro-users/" (Published Nov. 20, 2013), 5 pages.

support.box.com/hc/en-us/articles/200864518-Step-5-Adjust-Your-Notifications (Published Dec. 15, 2014), 2 pages.

* cited by examiner

INPUT TABLE 300

| PORTION ID 302 | INPUT ID 304 | INPUT TYPE 306 | INPUT TIME 308 | INPUT POSITION 310 | DEPENDENCE RELATION 312 | USER ID 314 | PERCENT PORTION 316 |
|---|---|---|---|---|---|---|---|
| PORTION 318a | INPUT 320a | EDIT | TIME 322a | POSITION 324a | -- | USER 328a | 100% |
| | INPUT 320b | SUGGESTED CHANGE | TIME 322b | POSITION 324b | -- | USER 328b | -- |
| | INPUT 320c | COMMENT | TIME 322c | POSITION 324c | INPUT ID 326c | USER 328c | -- |
| PORTION 318b | INPUT 320d | EDIT | TIME 322d | POSITION 324d | -- | USER 328d | PERCENT 330d |
| | INPUT 320e | EDIT | TIME 322e | POSITION 324e | -- | USER 328e | PERCENT 330e |
| | INPUT 320f | COMMENT | TIME 322f | POSITION 324f | -- | USER 328f | -- |
| | INPUT 320g | COMMENT | TIME 322g | POSITION 324g | INPUT ID 326g | USER 328g | -- |

Fig. 3

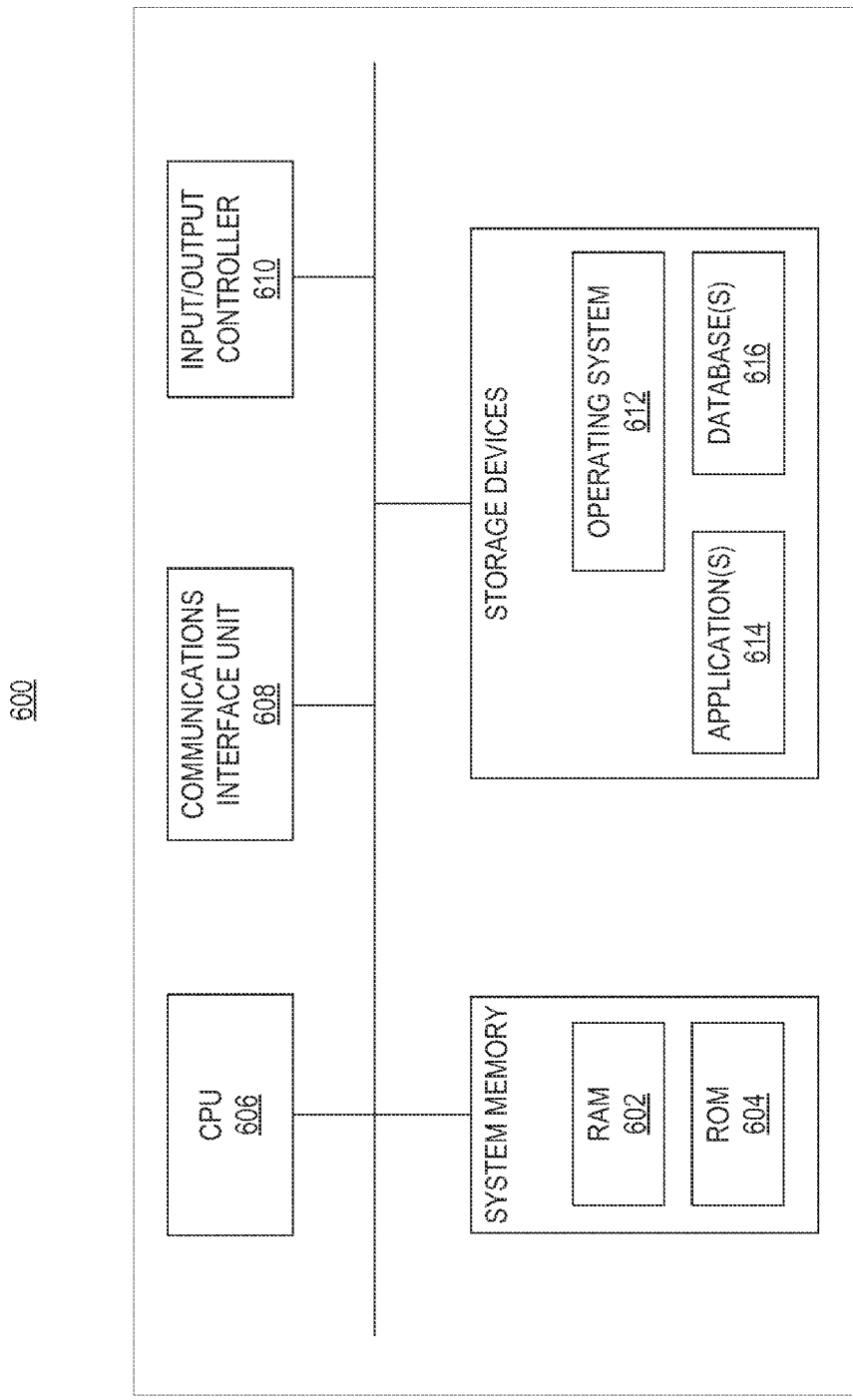

CHANGE NOTIFICATION ROUTING BASED ON ORIGINAL AUTHORSHIP OF MODIFIED REGION

INTRODUCTION

Personal computers traditionally use only directly accessible resources to run programs and store files. But as network access has become more widespread, it has become feasible to run programs and store files using remote resources. The use of remote resources, commonly referred to as cloud computing, can allow a user to access a file or an application using any device that can access a network. Cloud computing can thereby reduce the user's need for local computer resources and assure the user that, regardless of which device is available, the user will be able to access an up-to-date version of a desired file. Moreover, granting multiple users access to a file allows a group to collaborate on a document without raising questions of whether a file received by a collaborator reflects recent updates by other collaborators.

SUMMARY

It is a realization of the inventors that while cloud computing may present an up-to-date version of a document to a user, it does not inform a user when there has been a change or other feedback that may require her attention. If a collaborator neglects to inform a user that he has modified something she has written, she will not realize that a change has been made until she thinks to look back over a document that she may have thought complete. Even then, she may overlook the change. Thus there exists a need in the art to notify a user of inputs made to a portion associated with the user by other users. The systems and methods described herein allow a cloud computing system to identify the portion of a document associated with an input and to notify users associated with the identified portion of the inputs.

In certain aspects, the systems and methods described herein relate to editing an electronic document. A communication processor receives an input associated with a portion of the electronic document from a first user. In some implementations, the input comprises all data associated with the portion of the electronic document and received from the first user during a predetermined period, such as the period starting when the first user accesses the electronic document and ending when the first user exits the electronic document, or the period beginning when the first user begins to generate the input and ending after the first user has not generated further input for a predetermined amount of time. A document processor identifies a second user associated with content of the portion, in some implementations by identifying a user who generated the portion, who generated a predetermined proportion of the portion, who last edited the portion, who subscribed to updates regarding the portion, or who is in some other suitable way associated with the portion. The document processor further transmits information regarding the input to the second user.

BRIEF DESCRIPTION OF THE DRAWINGS

The systems and methods described herein are set forth in the appended implementations. However, for the purpose of explanation, several embodiments are set forth in the following drawings.

FIG. 3 is a table of information regarding user inputs to a document, according to an illustrative implementation;

FIG. 6 is a block diagram of a computing device for performing any of the processes described herein, according to an illustrative implementation.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to collaboration on an electronic document. When a user generates an input to an electronic document, the collaborative document system may identify a portion of the electronic document with which the input is associated. While updating the document to reflect the input, the collaborative document system may identify a portion of the document associated with the input, and further identify one or more users associated with the identified portion of the document. The collaborative document system may then transmit a notification regarding the input to the identified users.

Figure 1:
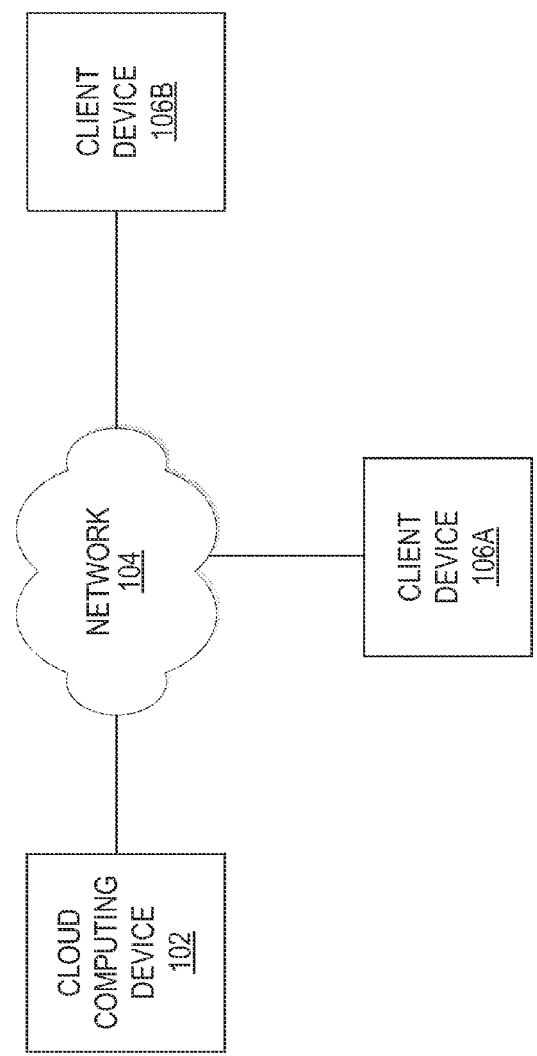
FIG. 1 is a block diagram of a collaborative document editing system, according to an illustrative implementation.

FIG. 1 is an illustrative block diagram of a collaborative document editing system 100, in which cloud computing device 102 provides computing services to one or more users. Such services may include allowing users to generate, store, access, revise, or delete electronic documents. Electronic documents may include text, pictures, audio files, video files, presentation files, spreadsheets, binary data files, computer instructions, HyperText Markup Language (HTML) files, or other suitable files. Cloud computing device 102 may be a server, a personal computer, a mainframe, a cluster of computing devices, or some other suitable computing device, and is described in more detail in relation to FIG. 2. Cloud computing device 102 may provide services to users via network 104. Network 104 is a computer network, and in certain implementations may be the Internet. One or more users may access the services provided by cloud computing device 102 through client devices 106*a* and 106*b* (collectively, client devices 106).

A client device 106 is a computing device used to access cloud computing device 102, and may be a personal laptop computer, a personal desktop computer, a tablet computer, a smartphone, a game console, or some other suitable computing device. In certain implementations, client device 106 may be associated with a cloud service account on cloud computing device 102. In such implementations, client device 106 may provide information identifying itself to cloud computing device 102 upon first connecting to cloud computing device 102, and cloud computing device 102 may provide a service to client device 106 upon verifying the identity of client device 106. Although two client devices 106 are depicted for simplicity, multiple users may access cloud computing device 102 using one or more client devices 106.

Collaborative document editing system 100 allows users to access services provided by cloud computing device 102. Client devices 106 connect to cloud computing device 102 through network 104. Cloud computing device 102 may then provide services to a user by transmitting data to a client device 106. As described in relation to FIGS. 2 and 3, cloud computing device 102 may notify one set of users when a different user has made some input to a document.

Figure 2:
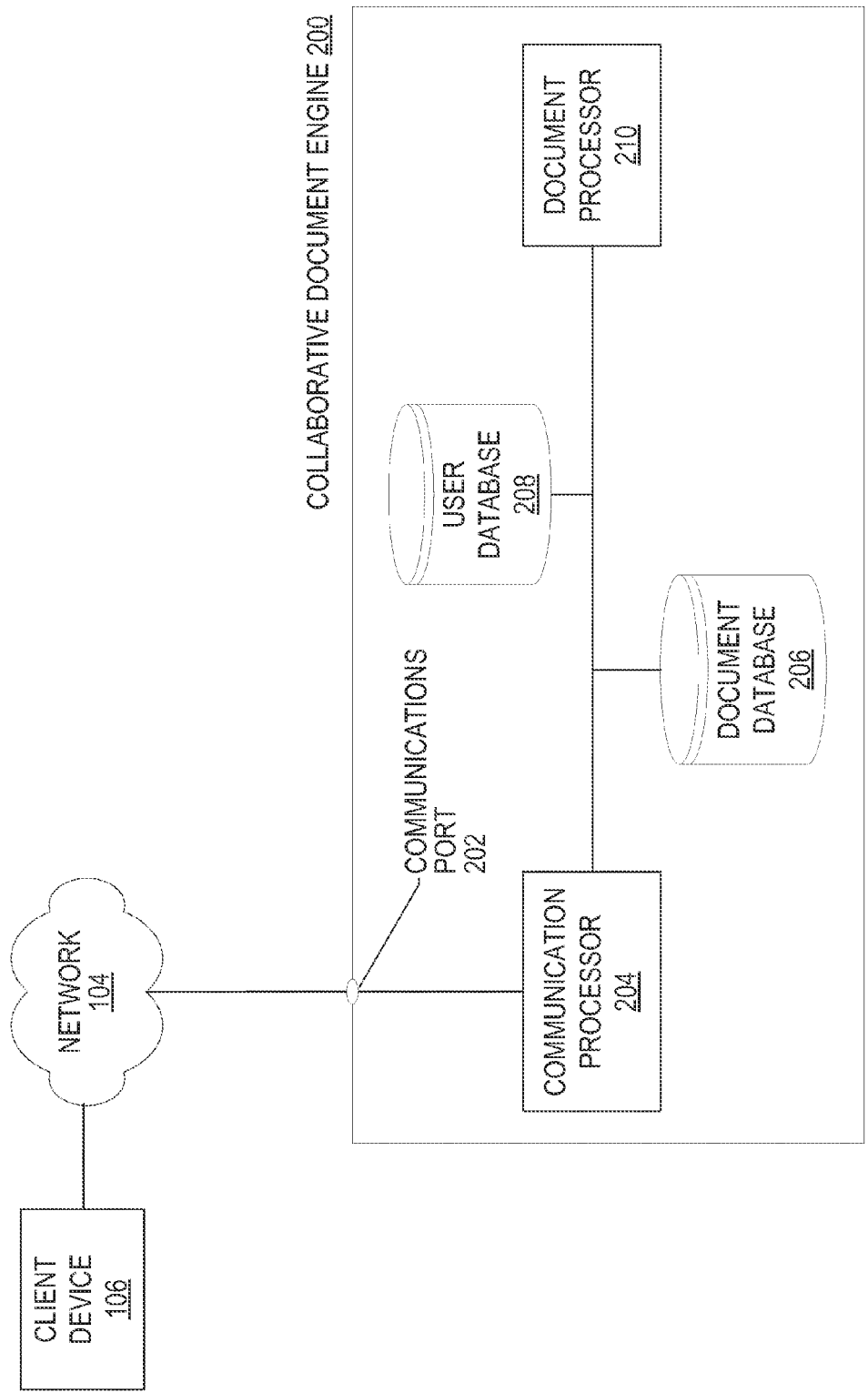
FIG. 2 is a block diagram of a collaborative document engine, according to an illustrative implementation.

FIG. 2 is an illustrative block diagram of a collaborative document engine 200, which may act as the cloud computing device 102 of FIG. 1. Collaborative document engine 200 allows a user to use client device 106 to access services over network 104. Collaborative document engine 200 transmits and receives data through communications port 202. Communication processor 204 identifies user instructions received through communications port 202 and transmits information to the client device 106 based on the received instructions. Electronic documents are stored in document database 206, user information is stored in user database 208, and documents may be accessed, generated, altered, deleted, or otherwise manipulated by document processor 210.

The depicted communications port 202 is a network port which sends and receives data via network 104, which may include user commands, input to an electronic document stored by collaborative document engine 200, or other suitable data. Communications port 202 may include a 100BASE-TX port, a 1000BASE-T port, a 10GBASE-T port, a Wi-Fi antenna, a cellular antenna, or other suitable network ports. In certain implementations, there may be a different number of ports than are depicted.

Communication processor 204 may be a computer processor that routes or acts upon data received through communications port 202. Upon a client device 106 connecting to collaborative document engine 200, communication processor 204 may identify a user associated with the connection, in certain implementations by comparing information provided in the connection request to information stored in user database 208. Communication processor 204 may further identify the client device 106 from packet headers identifying the source of received data, by querying the client device 106, from information provided by the client device 106 at login, or through some other suitable method of identifying client device 106. Communication processor 204 may forward user commands associated with a computing service to document processor 210, and may transmit data associated with an electronic document to a client device 106 based on the output of document processor 210. In certain implementations, communication processor 204 may encrypt communications to and decode communications from a client device 106 using the Secure Sockets Layer (SSL) protocol, the Transport Layer Security (TLS) protocol, or another suitable protocol.

In some implementations, communication processor 204 may verify that a user command regarding a document is authorized based on one or more predetermined criteria, which may include whether the user command is associated with a user account authorized to access the document, whether the user command was generated by an application associated with the user account and authorized to access the document, or other suitable criteria. In such implementations, if communication processor 204 does not verify the authorization of the user command, the communication processor 204 may perform one or more remedial actions, which may include transmitting an error message to a client device associated with the user command, generating a warning to the user or a system administrator, or other remedial actions.

Document database 206 may be a computer-readable and -writable medium storing at least one document associated with a collaborative document editing system 100, which may include text, images, audio files, video files, spreadsheets, presentation files, HTML files, uncompiled computer code, compiled computer code, or other suitable resources. Document database 206 may record documents as an ordered list of mutations, where a mutation represents a change to the document. Illustrative examples of mutations include inserting text, deleting text, inserting a graphic, and moving a graphic. Thus, instructing a client device 106 to apply each mutation in the ordered list in the appropriate order recreates the document on the client device 106.

Document database 206 may store information regarding changes to each document, which may include a record of which objects the document included at one or more times in the past, the contents of the included objects at those times, or other suitable information. In implementations in which objects are stored in a separate object database, the information regarding changes to a document stored by document database 206 may indicate only the changes in which objects were included in the document, while the object database may record information regarding how the objects changed with time.

Document database 206 may also store metadata associated with each document, which may include one or more of user-generated comments regarding the content of the document, a record of when, how, and by whom the resource was previously accessed or edited, a MIME type of the document, a list of one or more users associated with the document, whether a user associated with the resource may access, edit, or delete the document, the application used to generate the resource, a default application for accessing the resource, or other suitable information. In some implementations, a portion of document database 206 may be accessed through a remote network, and may be a third-party database.

User database 208 may be a computer-readable and -writable medium storing information associated with at least one user of collaborative document engine 200. The information may include one or more of cloud computing account information associated with the user, pointers to the files associated with the user, information regarding whether a user may access or manipulate a file associated with the user, a list of at least one client device 106 associated with the user, user-specified preferences, or other suitable user information. In some implementations, user database 208 may be integrated with document database 206: a user's files and links to files may be stored with other user information.

Document processor 210 may be a computer processor that provides computing services to a user by carrying out user instructions and transmitting information to the user via communication processor 204, network 104, and client device 106. The computing services provided by document processor 210 may include one or more of document storage, collaborative document editing, and other suitable computer services. Document processor 210 may record both a user's input to a document and which user generated the input. As described in relation to FIG. 3, document processor 210 may respond to user input by identifying a portion of the electronic document associated with the user input, identifying one or more users associated with the portion of the electronic document. Document processor 210 may further generate a message to those users who are associated with the identified portion of the document but did not generate the user input. Document processor 210 may provide such messages to communication processor 204 for routing to its intended recipients. In some implementations, such messages may only be generated based on user preferences, the type of input (e.g., whether the input is a comment, a suggested change, or an edit), the length of the input, whether the input represents fixes of typographical errors or substantive changes to the document, or if the input meets some other suitable criteria.

Collaborative document engine 200 sends data to and receives data from client device 106 at communications port 202 via network 104. Communication processor 204 may identify a cloud computing account associated with a user upon the establishment of a connection with a client device 106. Communication processor 204 may also compare information provided by or through client device 106 with information stored in document database 206 or user database 208 to verify that the user has access to an electronic document that the user requests. Communication processor 204 also forwards document input from a user to document processor 210. Document processor 210 modifies a document in document database 206 based on authorized user inputs, and further identifies a portion of the document associated with the input and generates a message regarding the input to one or more users associated with the portion who did not generate the input.

In some implementations, one or more elements of collaborative document engine 200 may also or alternatively be implemented on a client device 106. In some such implementations, elements may be implemented differently on a client device 106 than they are on collaborative document engine 200. As an illustrative example of such implementations, a client device 106 may allow a user to identify which portions of a document an input relates to or request that users associated with a portion of the document affected by the input be notified of the input.

FIG. 3 is an illustrative input table 300, depicting information regarding user inputs to a document. Referring to FIG. 2, input table 300 may be stored in document database 206. Input table 300 is a computer-readable and -writable medium capable of storing information regarding input to a collaborative document. An input table 300 may associate each portion of a document with one or more inputs that collectively make up the portion. A portion may be a paragraph, a section, or some other suitable collection of the content of the document. Each portion has a portion ID 302, and each input has an input ID 304, an input type 306, an input time 308, an input position 310, and an associated user ID 314. Inputs may also have a dependence relation 312 and a percent portion 316. As depicted, input table 300 represents a document with a portion 318a and a portion 318b (collectively, portions 318). Portion 318a is associated with inputs 320a-320c and portion 318b is associated with inputs 320d-320g. Times 322a-g indicate when the corresponding input from inputs 320a-g were made; likewise, positions 324a-g indicate where in the document and users 328a-g indicate by whom inputs 320a-g were made. Inputs 320a and 320d-320e are edits, that is, direct changes to the document. An edit may generate its associated portion or merely modify it. As depicted, input 320a is the only edit in portion 318a, and thus represents 100% of portion 318a; in contrast, input 320d and input 320e represent percent 330d and percent 330e, respectively, of portion 318b. Input 320b is a suggested change, an edit to the document that may be accepted or rejected by another user. In some implementations, the user allowed to accept or reject a suggested change is the user who generated the document; in some others, it is the user who generated the relevant portion of the document. Inputs 320c and 320f-320g are comments, notes that users create regarding a portion or sub-portion of the document and separate from the content of the document. Positions 324c and 324f-324g may therefore represent a range of positions in the document rather than one single position. Inputs 320c and 320g are also depicted as being dependent on other inputs, represented by input IDs 326c and 326g respectively. A first input depends on a second when the first refers to or is positioned amongst the second and the second is a suggested change or a comment. Input IDs 326c and 326g may therefore refer to input 320b and input 320f, respectively. In some implementations, inputs may also be considered dependent on edits.

Figure 4:
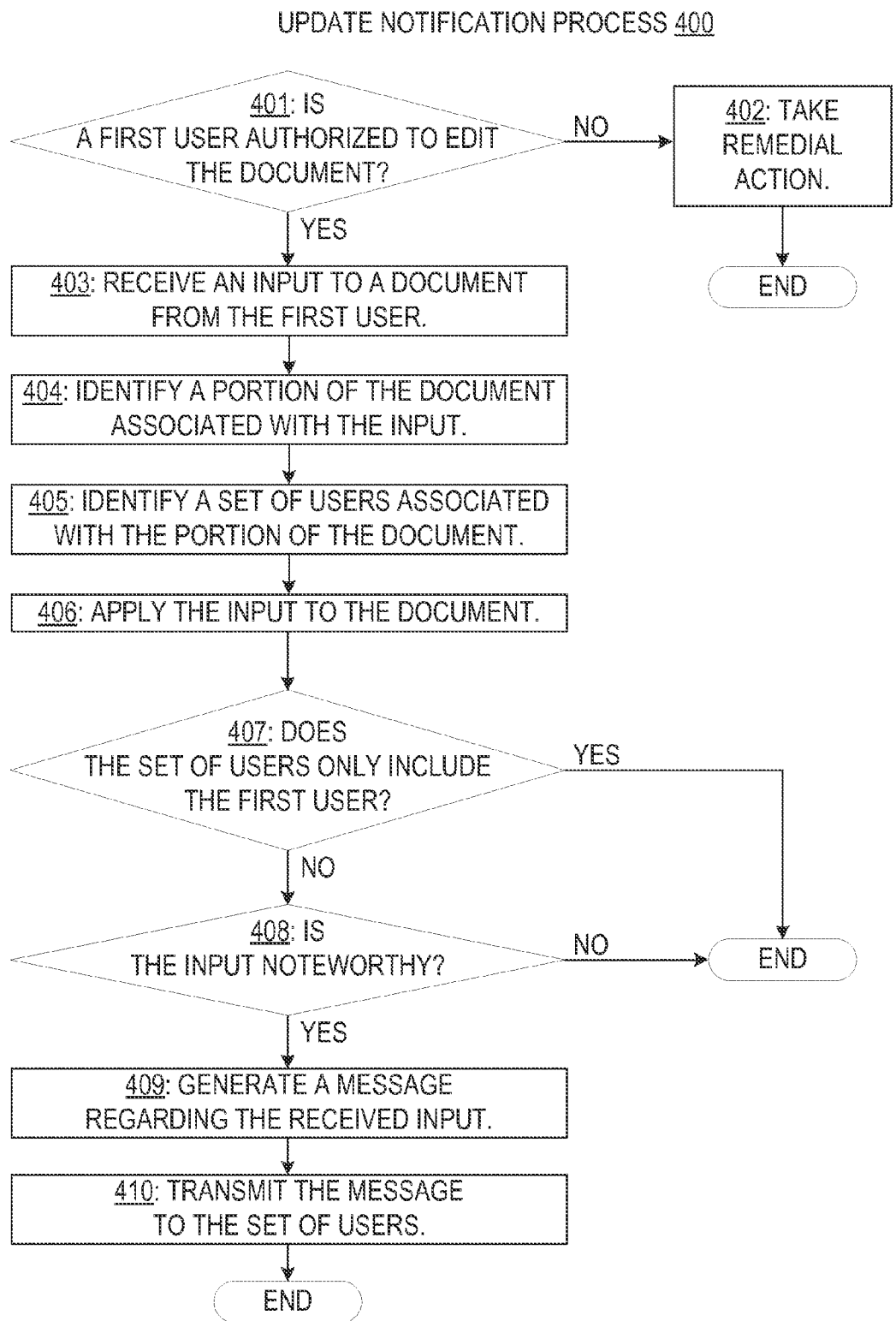
FIG. 4 is a flow chart of a process for notifying users of a first user's input to a document, according to an illustrative implementation.

FIG. 4 is an illustrative flow chart of an update notification process 400. Update notification process 400 notifies interested users when input is made to a portion of a document. Referring to FIG. 2, update notification process 400 may begin with step 401, in which communication processor 204 receives a first user's request to access a document and determines whether the first user is authorized to edit the document. To carry out step 401, communication processor 204 may determine whether user database 208 or document database 206 indicates that the user is allowed to edit, suggest modifications to, or comment on the document. If the first user is not authorized to edit the document, update notification process 400 ends with step 402, in which communication processor 204 performs one or more remedial actions. Such remedial actions may include transmitting an error message to a client device associated with the input, generating a warning to the user or a system administrator, or other remedial actions. In some implementations, the first user may be authorized to access but not edit a document. In such implementations, communication processor 204 may instruct a client device 106 associated with the first user to display the document but not provide the first user with any document editing tools. But if the first user is authorized to edit the document, update notification process 400 proceeds to step 403.

In step 403, communication processor 204 receives and forwards an input from the first user to document processor 210 for processing. The input may be an edit or a suggested modification to the content of the document, a comment, or some other suitable input. The input may include all data generated by a user during a predetermined period. Such a predetermined period may be the period starting when the user accesses the electronic document and ending when the user exits the document, or the period beginning when the user first generates input and ending after the user has not generated further input for a predetermined amount of time. The document that the input is directed to may be identified based on how the input is addressed: as an illustrative example, if the input is provided by email, the local part of the email address may identify the document while the domain may identify collaborative document engine 200. The user who submitted the input may be identified based on the client device 106 from which the input was received, on a user account identified in metadata associated with the input, or on some other basis.

In step 404, document processor 210 identifies the portion of the document associated with the input. A portion of the document associated with the input may be determined based on a location specified by the input. Along with the content of the edit, modification, or comment, the input specifies a location or range of locations within the document to which the input should apply. As illustrative examples, an input adding a word will indicate where the word should be added within the document; a suggested deletion of a circle will indicate which circle the suggestion refers to; and a comment regarding a paragraph will indicate to which string of text the comment is directed. The portion of the document associated with the input may then be the portion of the document that includes the specified location or range of locations. Document processor 210 may identify the extent of the portion associated with the input based on user-generated indicators (e.g., section breaks, paragraph breaks, or spreadsheet workpages), characteristics of content surrounding the input (e.g., how many users contributed to the surrounding content, whether the surrounding content was generated during a single period, whether the surrounding content includes a predetermined percentage of keywords related to keywords of the input), or on other suitable grounds.

In step 405, document processor 210 identifies a set of users associated with the portion identified in step 404. Referring to FIG. 3, document processor 210 may identify such users based on which user 328 is associated with the earliest edit associated with the portion, the most recent input associated with the portion, the edit representing the largest percent portion 316, or on some other suitable criteria. As an illustrative example, if the portion includes a block of text comprising a first set of text generated by a first user and a second set of text subsequently added by a second user, document processor 210 may identify the first user, the second user, or both users in step 405. In step 406, document processor 210 applies the input to the document by revising the appropriate data in document database 206. In some implementations, communication processor 204 may then forward the input to other users accessing or associated with the document to present them with an up-to-date version of the document.

In step 407, document processor 210 determines whether the set of users identified in step 405 is limited to the first user. If it is, update notification process 400 may end. Otherwise, in step 408, document processor 210 further determines if the input is noteworthy. The input may be noteworthy if it meets certain predetermined criteria, such as whether the input includes a predetermined amount of text, whether the input includes a substantive change (e.g., adding or deleting words rather than changing spelling or punctuation marks), or other suitable criteria. In some implementations, the predetermined criteria may be user-selected. As an illustrative example of such implementations, a user may request to be notified if someone else edits content she wrote, but not if someone comments on her content. In such an example, document processor 210 would find an edit to be noteworthy but not a comment. If the input is not noteworthy, update notification process 400 ends; otherwise, it proceeds to step 409.

In step 409, document processor 210 generates a message to each user in step 405's set of users regarding the received input, excluding the first user who generated the input of step 401. Thus, a message may be generated to not only the second, but (as an illustrative example) a third and a fourth user in response to a single input. In some implementations, different users will receive different messages in response to the same input. The message may be an email, a pop-up message, a push notification to a mobile device, or some other suitable notification. The message may identify the type of input received (e.g., an edit, a suggested modification, or a comment), the content of the input, the size of the input, or some other suitable information regarding the input. Document processor 210 may vary the form and content of generated messages based on the type of input received, user preferences of a message's recipient, whether the message's recipient is presently accessing a computer service provided by collaborative document engine 200, or some other suitable criteria. Update notification process 400 concludes with step 410, in which communication processor 204 transmits the generated message or messages to its recipients. In some implementations, the first user is then associated with the portion identified in step 404.

Update notification process 400 may be applied to any input, and more than one such process may be carried out simultaneously. Thus, a second input associated with a second portion of the electronic document may be received from the first user after step 401, and update notification process 400 may then identify a third user associated with the content of the second portion and transmit information regarding the second input to the third user. In some implementations, input received during step 401 may be treated as two separate inputs if the input includes edits, suggested modifications, or comments addressed to two distinguishable portions of the document.

Figure 5:
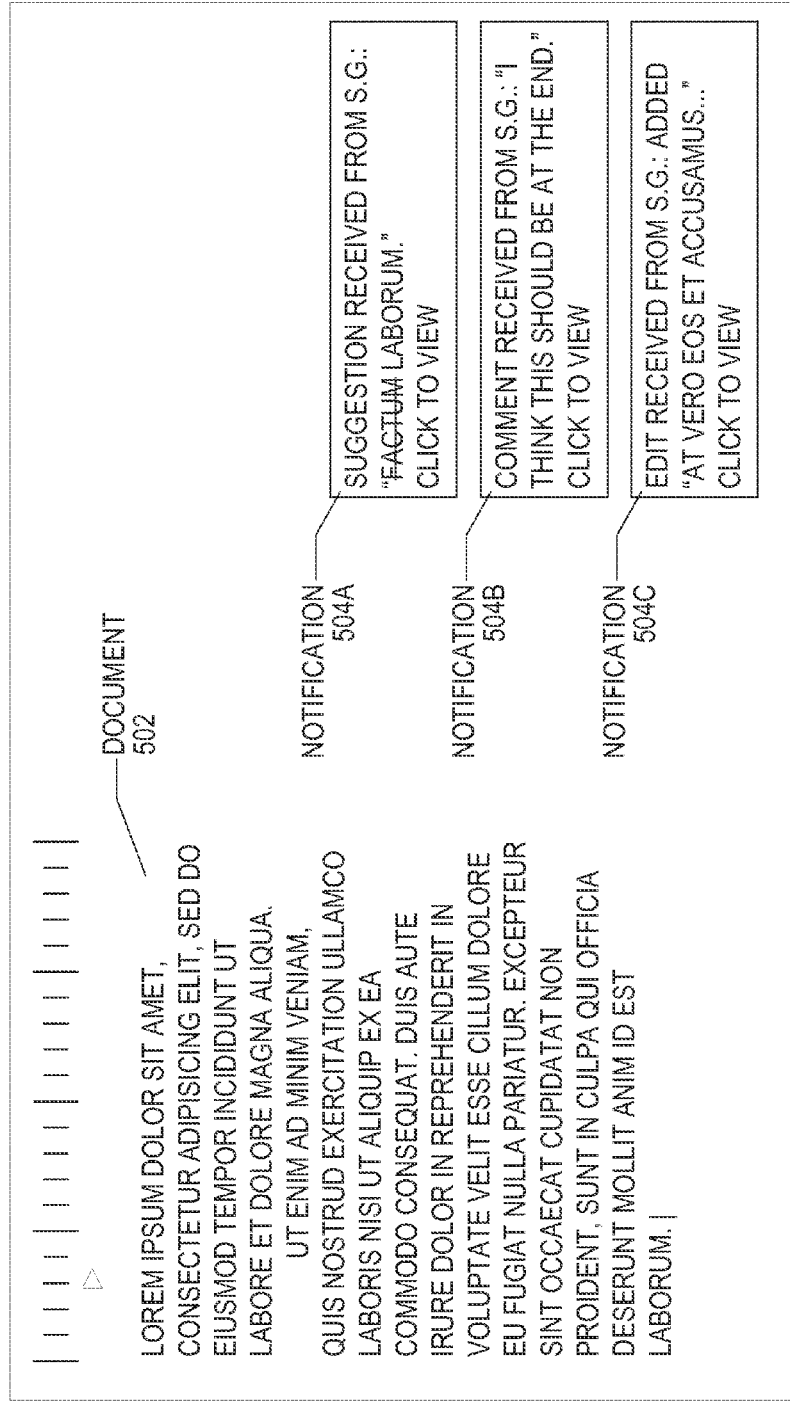
FIG. 5 is an illustrative screenshot of a user interface notifying a user of another user's input.

FIG. 5 depicts an exemplary screenshot of a user interface 500, displayed on a client device 106 and notifying a user of another user's input. As depicted, user interface 500 displays part of an electronic document 502 that a user is accessing when she receives notifications 504A-504C (collectively, notifications 504). Each notification 504 informs the user that another user has provided some input to the document and provides a link to where the input was made. Notification 504A informs her of a suggested change, notification 504B informs her of a comment, and notification 504C informs her of an edit to the document. In some implementations, one or more notifications 504 may provide a different amount of information regarding the input. Illustrative examples of such implementations include providing no text of the input, providing the complete text of the input, providing some content of the document where the input was made for context, not providing a link to the input, and specifying which document the input was made to. While FIG. 5 depicts notification 504 as an unobtrusive pop-up, notifications may also or alternatively be transmitted as e-mails, push notifications to mobile computing devices, or other suitable messages.

FIG. 6 is a block diagram of a computing device that can be used to implement or support any of the components of the system of FIG. 1 or 2, and for performing any of the processes described herein. Collaborative document engine 200 may be implemented on one or more computing devices 600 having suitable circuitry, and client device 106 may communicate with cloud computing device 102 through one or more computing devices 600 having suitable circuitry. In certain aspects, a plurality of the components of collaborative document editing system 100 may be included within one computing device 600. In certain implementations, a component and a storage device may be implemented across several computing devices 600.

The computing device 600 comprises at least one communications interface unit 608, an input/output controller 610, system memory, and one or more data storage devices. This can support a network connection such as a connection to network 104 in FIG. 1. The system memory includes at least one random access memory (RAM 602) and at least one read-only memory (ROM 604). RAM 602 can support the document database 206 of FIG. 2, for example. All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 may be linked, via network or local network, to other servers or systems.

The computing device 600 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 608 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers, or client terminals.

The CPU 606 is also in communication with the data storage device. The data storage device may comprise an appropriate combination of magnetic, optical, or semiconductor memory, and may include, for example, RAM 602, ROM 604, flash drive, an optical disc such as a compact disc, or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program. The depicted database 616 can be any suitable database system, and can be a local or distributed database system.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602, or from a computer data signal embodied in a carrier wave, such as that found within the well-known Web pages transferred among devices connected to the Internet. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a collaborative document editing system as described herein. The program also may include program elements such as an operating system 612, a database management system, and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, a user may request to be informed of inputs by one user no more than once per day or other unit of time, but request to be informed whenever a third user makes an input to the document. It should be understood that various alternatives to the embodiments of the disclosure described herein may be employed in practicing the disclosure. Elements of an implementation of the systems and methods described herein may be independently implemented or combined with other implementations.

I claim:

1. A computer-implemented method for editing an electronic document, comprising:
   receiving, from a first user, an input associated with a first portion of the electronic document;
   identifying a second user associated with content of the first portion of the electronic document, wherein the second user is associated with the first portion of the document based on an input the second user provides to the first portion of the document;
   identifying a third user associated with content of a second portion of the electronic document;
   determining a set of users that have provided other input to the first portion of the document;
   transmitting a notification regarding the input to the set of users; and
   automatically excluding the third user from the notification regarding the input to the first portion of the electronic document.

2. The method of claim 1, wherein the second user generated the content of the first portion of the electronic document.

3. The method of claim 1, wherein the second user is the last user to have edited the content of the first portion of the electronic document before the input was received.

4. The method of claim 1, wherein the second user generated at least a predetermined proportion of the content of the first portion of the electronic document.

5. The method of claim 1, further comprising receiving, from the second user, a request to subscribe to modifications associated with the first portion of the electronic document.

6. The method of claim 1, wherein the input comprises all data associated with the first portion of the electronic document and received from the first user during a predetermined period.

7. The method of claim 6, wherein the predetermined period comprises a period starting when the first user accesses the electronic document and ending when the first user exits the electronic document.

8. The method of claim 6, wherein the predetermined period comprises a period beginning when the first user begins to generate the input and ending after the first user has not generated further input for a predetermined amount of time.

9. The method of claim 1, wherein the first portion includes a block of text comprising a first set of text generated by the second user and additions to the first set of text generated by at least one user other than the second user.

10. The method of claim 1, further comprising:
    receiving, from the first user, a second input associated with the second portion of the electronic document; and
    transmitting a notification regarding the second input to the third user.

11. The method of claim 1, further comprising:
    determining that the input includes more than a predetermined amount of text,
    wherein the notification regarding the input is transmitted in response to determining that the input includes more than a predetermined amount of text.

12. The method of claim 11, wherein the input is assigned one of a plurality of input types, wherein the plurality of input types includes an edit to the content of the electronic document, a suggested modification of the content of the electronic document, and a comment.

13. The method of claim 1, further comprising:
    determining whether the input includes a change,
    wherein the notification regarding the input is transmitted in response to determining that the change meets a predetermined criteria, and
    wherein the predetermined criteria includes addition or deletion of text.

14. The method of claim 1, wherein the notification regarding the input identifies at least one of a type of the input, content of the input, and a size of the input.

15. The method of claim 1, further comprising:
    identifying a fourth user associated with the first portion of the electronic document, and
    transmitting a notification regarding the input to the fourth user.

16. The method of claim 1, further comprising associating the first user with the first portion of the electronic document.

17. A system of electronic document collaboration, comprising:
    a document database for storing a plurality of electronic documents;
    a user database for storing information regarding a plurality of users;
    a communications processor for receiving document input from a plurality of users and sending notifications to a plurality of users; and
    a document processor in communication with the document database, the user database, and the communications processor, wherein the document processor is configured to:
      identify a first portion of an electronic document associated with an input received from a first user,
      identify a second user associated with content of the identified first portion of the electronic document, wherein the second user is associated with the first portion of the document based on an input the second user provides to the first portion of the document;
      identify a third user associated with content of a second portion of the electronic document;
      determine a set of users that have provided input to the first portion of the document;
      generate a notification regarding the input to the set of users; and
      automatically exclude the third user from the notification regarding the input to the first portion of the electronic document.

18. The system of claim 17, wherein the second user generated the content of the first portion of the electronic document.

19. The system of claim 17, wherein the second user is the last user to have edited the content of the first portion of the electronic document before the input was received.

20. The system of claim 17, wherein the second user generated at least a predetermined proportion of the content of the first portion of the electronic document.

21. The system of claim 17, wherein the second user generated a request to subscribe to modifications associated with the first portion of the electronic document.

22. The system of claim 17, wherein the input comprises all data associated with the first portion of the electronic document and received from the first user during a predetermined period.

23. The system of claim 22, wherein the predetermined period comprises a period starting when the first user accesses the electronic document and ending when the first user exits the electronic document.

24. The system of claim 22, wherein the predetermined period comprises a period beginning when the first user begins to generate the input and ending after the first user has not generated further input for a predetermined amount of time.

25. The system of claim 17, wherein the first portion includes a first set of content generated by the second user and additions to the first set of content generated by at least one user other than the second user.

26. The system of claim 17, wherein the document processor is further configured to:
    identify second input received from the first user and associated with the second portion of the electronic document; and
    generate a notification regarding the second input to the third user.

27. The system of claim 17, wherein the document processor is further configured to:
    determine that the input includes more than a predetermined amount of text,
    wherein the notification regarding the input is generated in response to determining that the input includes more than a predetermined amount of text.

28. The system of claim 17, wherein the document processor is further configured to:
    determine whether the input includes a change,
    wherein the information regarding the input is transmitted in response to determining that the change meets a predetermined criteria, and
    wherein the predetermined criteria includes addition or deletion of text.

29. The system of claim 17, wherein the information regarding the input identifies at least one of a type of the input, content of the input, and a size of the input.

30. The system of claim 29, wherein the type of the input is one of a plurality of input types, wherein the plurality of input types includes an edit to the content of the electronic document, a suggested modification of the content of the electronic document, and a comment.

31. The system of claim 17, wherein the document processor is further configured to:
    identify a fourth user associated with the first portion of the electronic document, and
    generate a notification regarding the input to the fourth user.

32. The system of claim 17, wherein the document processor is further configured to associate the first user with the first portion of the electronic document.

* * * * *